US008589571B2

(12) United States Patent
Goldman et al.

(10) Patent No.: US 8,589,571 B2
(45) Date of Patent: Nov. 19, 2013

(54) METHOD AND APPARATUS FOR SCREENING REQUEST TO ESTABLISH SIP SESSION

(75) Inventors: Stuart O. Goldman, Scottsdale, AZ (US); Karl F. Rauscher, Emmaus, PA (US)

(73) Assignee: Alcatel Lucent, Paris (FR)

( * ) Notice: Subject to any disclaimer, the term of this patent is extended or adjusted under 35 U.S.C. 154(b) by 938 days.

(21) Appl. No.: 12/713,664

(22) Filed: Feb. 26, 2010

(65) Prior Publication Data

US 2011/0213888 A1     Sep. 1, 2011

(51) Int. Cl.
*G06F 15/16* (2006.01)
(52) U.S. Cl.
USPC .......................................................... 709/228
(58) Field of Classification Search
USPC .............. 709/207, 227–229; 370/389; 726/22
See application file for complete search history.

(56) References Cited

U.S. PATENT DOCUMENTS

| 7,991,144 | B2* | 8/2011 | Takahashi | 379/258 |
| 8,161,540 | B2* | 4/2012 | Mantripragada et al. | 726/13 |
| 8,224,954 | B2* | 7/2012 | Qiu et al. | 709/224 |
| 8,295,176 | B2* | 10/2012 | Khasnabish | 370/235 |
| 8,356,350 | B2* | 1/2013 | Buriano et al. | 726/22 |
| 2006/0050683 | A1* | 3/2006 | Wall et al. | 370/352 |
| 2010/0238839 | A1* | 9/2010 | Batteram et al. | 370/254 |
| 2012/0210421 | A1* | 8/2012 | Ormazabal et al. | 726/22 |

FOREIGN PATENT DOCUMENTS

EP          2101525 A1     9/2009

OTHER PUBLICATIONS

Chen, Eric Y., "Detecting DoS Attacks on SIP Systems," 2006, IEEE VoIP MaSe, pp. 51-56.*
RFC 4412—Communications Resource Priority for the Session Initiation Protocol (SIP), Network Working Group, The Internet Society, Feb. 2006, pp. 1-36.
De Gouveia et al., Emergency Services Control Model for Next Generation Networks, Fraunhofer Institute Fokus, Berlin, DE, Network Protocols and Algorithms, vol. 1, No. 2, 2009, pp. 99-112.
PCT App. No. PCT/US2011/022540, International Search Report, Apr. 6, 2011 (4 Pages).
PCT App. No. PCT/US2011/022540, Written Opinion of the International Searching Authority, Apr. 6, 2011 (7 Pages).

* cited by examiner

*Primary Examiner* — Douglas Blair
*Assistant Examiner* — Benjamin Ailes
(74) *Attorney, Agent, or Firm* — Fay Sharpe, LLP

(57) ABSTRACT

A method and apparatus for screening a request to establish a SIP session is provided. The method may include a) receiving a request to establish a SIP session at a network node of an internet protocol network and incrementing a counter, b) determining whether the request includes a resource priority parameter with an elevated priority value and, if so, incrementing a counter, c) comparing a ratio of the priority request count to the total request count to a threshold, and d) processing each request that includes the elevated priority value using more comprehensive screening after the ratio exceeds the threshold, allowing processing for each request that includes the elevated priority value to continue in accordance with the elevated priority value after the ratio does not exceed the threshold, and allowing processing for each request that does not include the elevated priority value to continue in accordance with a routine priority.

20 Claims, 8 Drawing Sheets

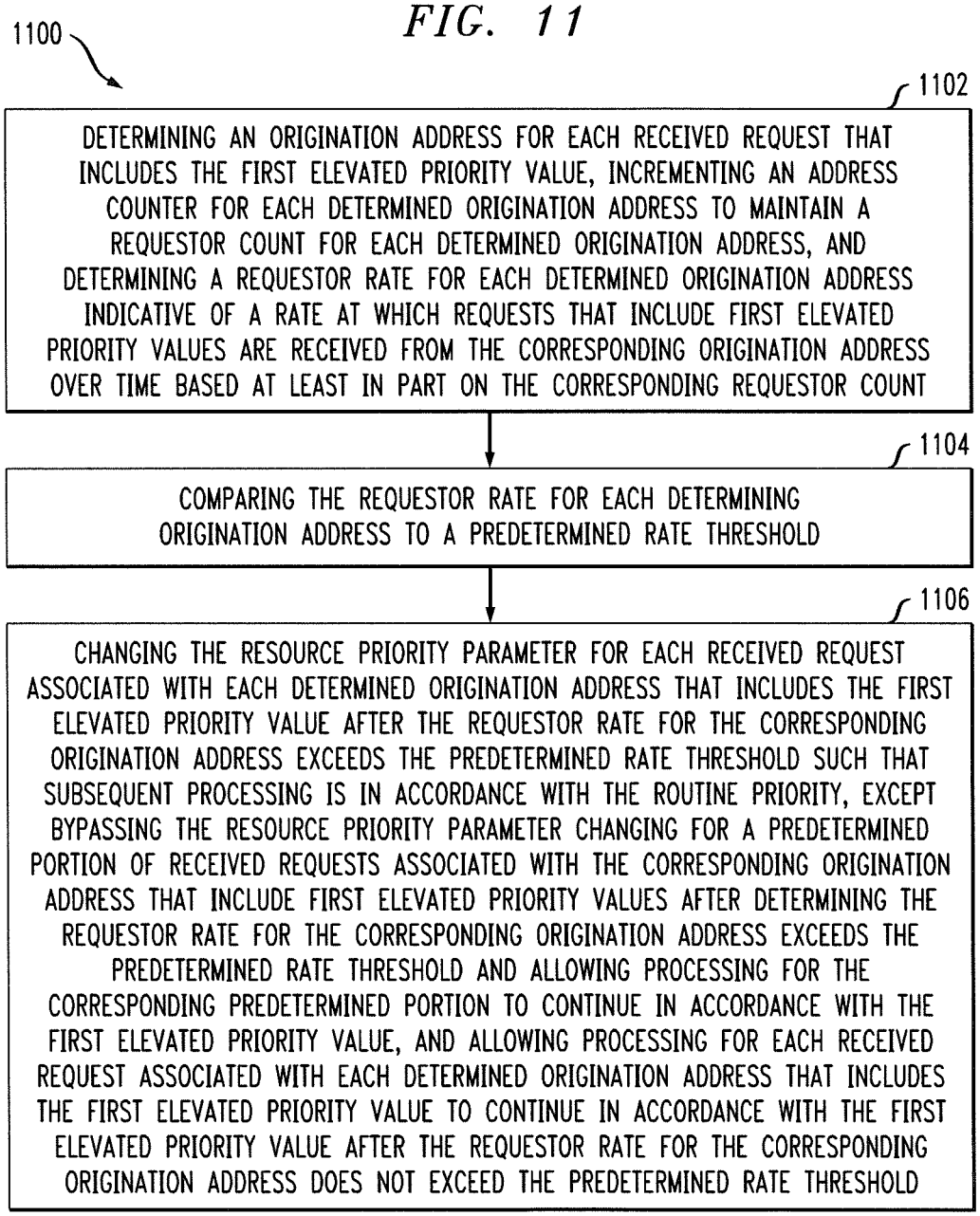

METHOD AND APPARATUS FOR SCREENING REQUEST TO ESTABLISH SIP SESSION

BACKGROUND

This disclosure relates to a method and apparatus for screening a request to establish a session initiation protocol (SIP) session in an internet protocol (IP) network. For example, this disclosure describes exemplary embodiments of network nodes within the IP network that could implement a process for screening an INVITE request to establish a SIP session. However, it will be appreciated that the disclosed concepts may have usefulness in other types of SIP requests, such as ACK, PRACK, UPDATE, REFER, MESSAGE, SUBSCRIBE, and NOTIFY requests. Moreover, this disclosure describes exemplary embodiments the method and apparatus for screening a request to establish a SIP session with origination and destination end points within the IP network. However, it will be appreciated that the origination end point, destination end point, or both can be in a non-IP network.

By way of background, the Internet Engineering Task Force (IETF) has approved a new protocol for communicating resource priority by inserting an optional session initiation protocol (SIP) header field in SIP requests, such as the SIP INVITE request. The optional header field is referred to a Resource Priority Header (RPH) and includes parameters so the corresponding SIP request, such as the INVITE message, signals that this session is to be given priority treatment and the corresponding level of such treatment. For additional information on RPH, refer to RFC 4412, Communications Resource Priority for the Session Initiation Protocol (SIP), Schulzrinne et al., The Internet Society, February 2006. For additional information on the INVITE request, refer to RFC 3261, SIP: Session Initiation Protocol, Rosenberg et al., The Internet Society, June 2002. The contents of both RFC 4412 and RFC 3261 are fully incorporated herein by reference.

One application for the RPH is the Government Emergency Telecommunication Service (GETS) in the next generation network (NGN) which is in the process of being defined for deployment in the United States and other countries. The GETS application is intended to allow government authorized users to have a high probability of session completion during times of crisis when an IP network providing communication services may be highly congested because of a manmade or natural disaster. It is imperative for continuity of government, mitigation of loss of life and property, and a more rapid restoration of order that these critical communications succeed even when normal communications are failing from the congestion caused by massive attempts and possible physical damage to the IP network.

It is advantageous to insert the RPH indicator in the SIP request as early as possible to prevent the message from be discarded by the overload controls protecting the router buffers. However, allowing the user equipment (UE) to insert the RPH can lead to a denial of service attack on the IP network during its most fragile state. Concern over UE insertion have led some to propose that UE insertion of the RPH be ignored out of fear of unauthorized users and the potential for a denial of service attack. However, this solution suffers from the potential loss of some session attempts from UE's in congested areas that are being dropped by congestion control mechanisms prior to reaching a network node that can insert the RPH for the caller.

Based on the foregoing, a solution that reduces the risk of a denial of service attack due to early insertion of the RPH, including UE insertion, is desirable. Additionally, a solution that operates on high volumes of traffic and high congestion by exception is desirable so that session processing is not burdened during low or medium congestion.

SUMMARY

In one aspect, a method for screening a request to establish a SIP session is provided. In one embodiment, the method includes a) receiving a first request to establish a SIP session at a network node of an Internet protocol network and incrementing a received request counter to maintain a total request count, b) determining whether the first request includes a resource priority parameter with a first elevated priority value and, if so, incrementing an elevated priority request counter to maintain a priority request count, c) comparing a priority request ratio to a predetermined priority request threshold, wherein the priority request ratio is indicative of a ratio of the priority request count to the total request count, and d) processing each first request that includes the elevated priority value using more comprehensive screening after the priority request ratio exceeds the predetermined priority request threshold, allowing processing for each first request that includes the first elevated priority value to continue in accordance with the first elevated priority value after the priority request ratio does not exceed the predetermined priority request threshold, and allowing processing for each first request that does not include the first elevated priority value to continue in accordance with a routine priority.

In another aspect, an apparatus in an internet protocol network for screening a request to establish a SIP session is provided. In one embodiment, the apparatus include: a received request counter; an input module for receiving a first request to establish a SIP session and in operative communication with the received request counter for incrementing the received request counter to maintain a total request count; an elevated priority request counter; a priority determining module in operative communication with the input module for determining whether the first request includes a resource priority parameter with a first elevated priority value and, if so, in operative communication with the elevated priority request counter for incrementing the elevated priority request counter to maintain a priority request count; a priority request comparator module in operative communication with the received request counter and elevated priority request counter for comparing a priority request ratio to a predetermined priority request threshold, wherein the priority request ratio is indicative of a ratio of the priority request count to the total request count; and a processor module in operative communication with the priority determining module and priority request comparator module for processing each first request that includes the first elevated priority value using more comprehensive screening after the priority request ratio exceeds the predetermined priority request threshold, allowing processing for each first request that includes the first elevated priority value to continue in accordance with the first elevated priority value after the priority request ratio does not exceed the predetermined priority request threshold, and allowing processing for each first request that does not include the first elevated priority value to continue in accordance with a routine priority.

In yet another aspect, a method for screening a request to establish a SIP session is provided. In one embodiment, the method includes: a) receiving a plurality of requests to establish a SIP session at a network node of an internet protocol network and incrementing a received request counter for each received request to maintain a total request count, b) determining whether the each received request includes a resource priority parameter with a first elevated priority value and, if so, incrementing an elevated priority request counter to maintain a priority request count, c) comparing a priority request ratio to a predetermined priority request threshold, wherein the priority request ratio is indicative of a ratio of the priority request count to the total request count, and d) processing each received request that includes the elevated priority value using more comprehensive screening after the priority request ratio exceeds the predetermined priority request threshold, allowing processing for each received request that includes the first elevated priority value to continue in accordance with the first elevated priority value after the priority request ratio does not exceed the predetermined priority request threshold, and allowing processing for each received request that does not include the first elevated priority value to continue in accordance with a routine priority.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

FIG. 11, in conjunction with FIG. 10, is a flow chart of still another exemplary embodiment of a process for screening a request to establish a SIP session.

DETAILED DESCRIPTION

Figure 1:
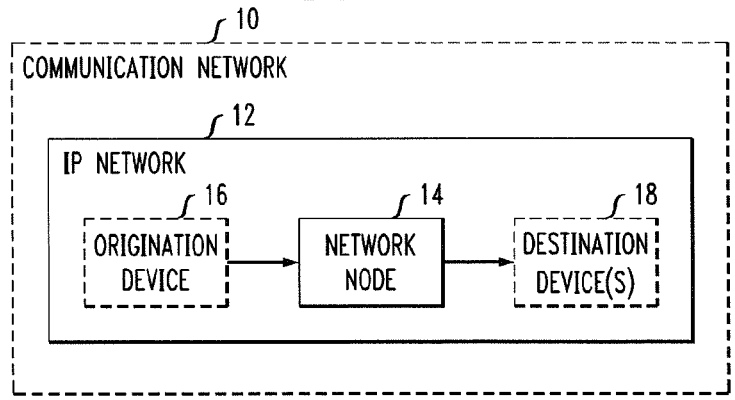
FIG. 1 is a block diagram of an exemplary embodiment of a communication system with a network node in an internet protocol (IP) network for screening a request to establish a SIP session.

Various embodiments of methods and network nodes in an IP network for screening a request to establish a SIP session are disclosed herein. Certain embodiments enable resource priority information to be inserted in the request by a user at a user device when the request is originated while reducing the risk of a denial of service attack from the user device. A request with an elevated priority would be serviced ahead of requests with routine priority. Certain embodiments of the methods and network nodes described herein process multiple elevated priority levels individually. For example, priority information in requests using GETS standards or Wireless Priority Service (WPS) standards have five valid levels of priority generally ranging from disaster recovery, public welfare, law enforcement, and military to executive leadership in order of precedence.

The UE may insert an RPH in a SIP request (e.g., INVITE request) originated by a user when the user explicitly selects an elevated resource priority for the request. If multiple elevated priority levels are available, the user would select the desired priority level and the UE would insert priority value in the RPH corresponding to the desired priority level. Intermediate network nodes are normally prevented from shedding the SIP request when performing load control if the RPH is inserted by the UE in conjunction with origination of the SIP request.

In one embodiment of a process for screening a request to establish a SIP session, the intermediate network node may keep rolling counters of total SIP requests (e.g., INVITE messages) and SIP requests with RPH. As long as the ratio of SIP requests with RPH to total SIP requests is below an established threshold for the intermediate network node, filtering would not be used to discard any SIP requests with RPH as long as there were sufficient SIP requests without RPH to allow the intermediate network node to prevent its buffer from overflowing. The rolling counters may be reset periodically at appropriate times to avoid overflow conditions and to reflect relatively current trends. Counter reset may be triggered by certain events, such as rising or falling threshold crossover; during light request traffic periods, particularly on days and times when request traffic is expected to be light; or daily, weekly, or another suitable calendar time period.

However when the ratio of SIP requests with RPH to total SIP requests exceeds the pre-established threshold for the intermediate network node, this is a strong indication that the priority traffic originating in front of that intermediate network node is exceeding expectations and may well be a denial of service attack. In such a case, the intermediate network node may now devote additional scarce resources to inspecting each SIP request (e.g., INVITE request) with RPH for its origination identification. This enables the intermediate network node to identify which UE or cluster of UEs is generating excessive amounts of the SIP requests with RPH.

Once such UEs are identified, the intermediate network node may remove the RPH (or change the RPH to a routine priority value) from SIP requests originated by the UE or cluster of UEs generating excessive requests with RPH, except that the intermediate network node may bypass the removing for one out of every N SIP requests with RPH. The N−1 SIP requests with the RPH removed would be subject to the normal discard filtering in accordance with a routine priority level, but the one out of N SIP requests with RPH would be allowed to keep its elevated priority status just in case it is a valid user of an elevated priority service.

When the ratio of SIP requests with RPH to total SIP requests falls below the threshold, the prior algorithm resumes and SIP requests are processed in a normal manner until the ratio exceeds the threshold again. This scheme allows priority communication requests to be established at the earliest possible point (e.g., UE), but still protects the IP network from a denial of service attack by detecting "abusing" UEs. This approach can be implemented by various types of IP network nodes and can be tailored to specific parameters of the specific network node in which it is implemented. Overall, this method for screening a request to establish a SIP session provides better treatment of priority communication requests during a crisis than implemented in previous generations of IP networks or contemplated for the next generation IP network.

Referring now to the drawings wherein the showings are for purposes of illustrating the exemplary embodiments only and not for purposes of limiting the claimed subject matter, FIG. 1 depicts an exemplary embodiment of a communication system 10 with an IP network 12 that includes a network node 14 for screening a request to establish a SIP session. In this embodiment, the SIP request is originated by an origination device 16 within the IP network 12. The SIP request identifies one or more destination devices 18 within the IP network 12 as destinations for the SIP session.

Figure 2:
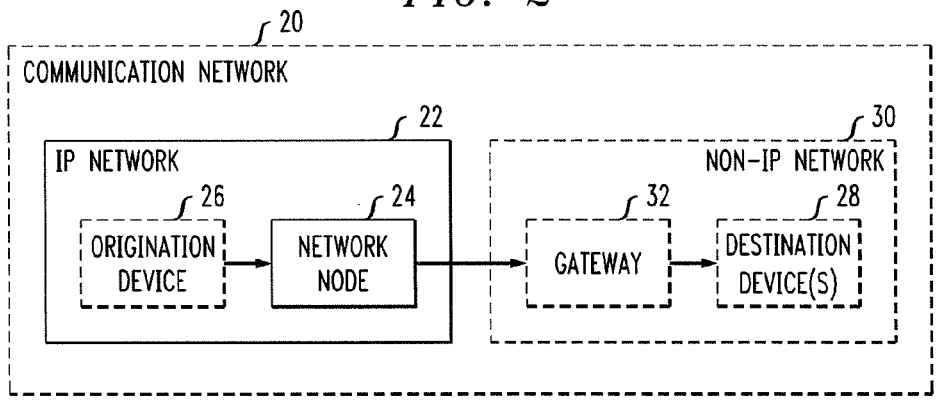
FIG. 2 is a block diagram of another exemplary embodiment of a communication system with a network node in an IP network for screening a request to establish a SIP session.

Another exemplary embodiment of a communication system 20 with an IP network 22 that includes a network node 24 for screening a request to establish a SIP session is shown in FIG. 2. In this embodiment, the SIP request is originated by an origination device 26 within the IP network 22. The SIP request identifies one or more destination devices 28 within a non-IP network 30 as destinations for the SIP session. The non-IP network 30 may include a public switched telephone network (PSTN), a wireless telephone network, a cellular telephone network, a satellite telephone network, or any suitable type of non-IP communication network in any combination. The non-IP network 30 also includes a gateway 32 to interface between the destination device(s) 28 and the IP network 22.

Figure 3:
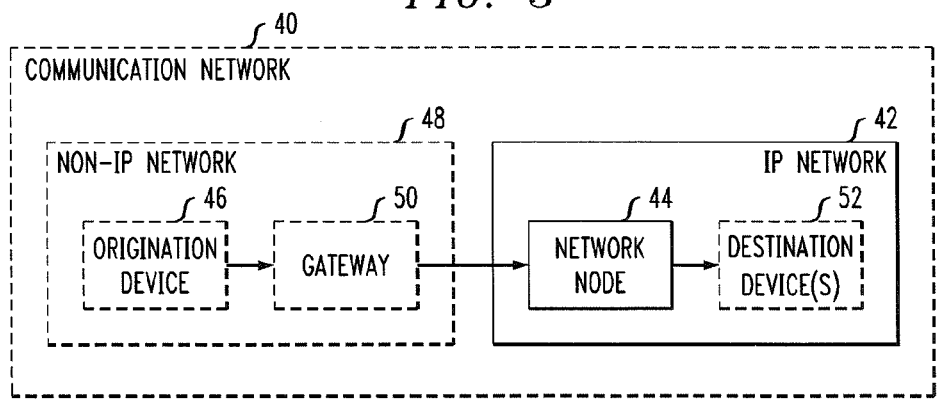
FIG. 3 is a block diagram of yet another exemplary embodiment of a communication system with a network node in an IP network for screening a request to establish a SIP session.

Yet another exemplary embodiment of a communication system 40 with an IP network 42 that includes a network node 44 for screening a request to establish a SIP session is shown in FIG. 3. In this embodiment, the SIP request is originated by an origination device 46 within a non-IP network 48. The non-IP network 48 may include a PSTN, a wireless telephone network, a cellular telephone network, a satellite telephone network, or any suitable type of non-IP communication network in any combination. The non-IP network 48 also includes a gateway 50 to interface between the origination device 46 and the IP network 42. The SIP request identifies one or more destination devices 52 within the IP network 42 as destinations for the SIP session.

Figure 4:
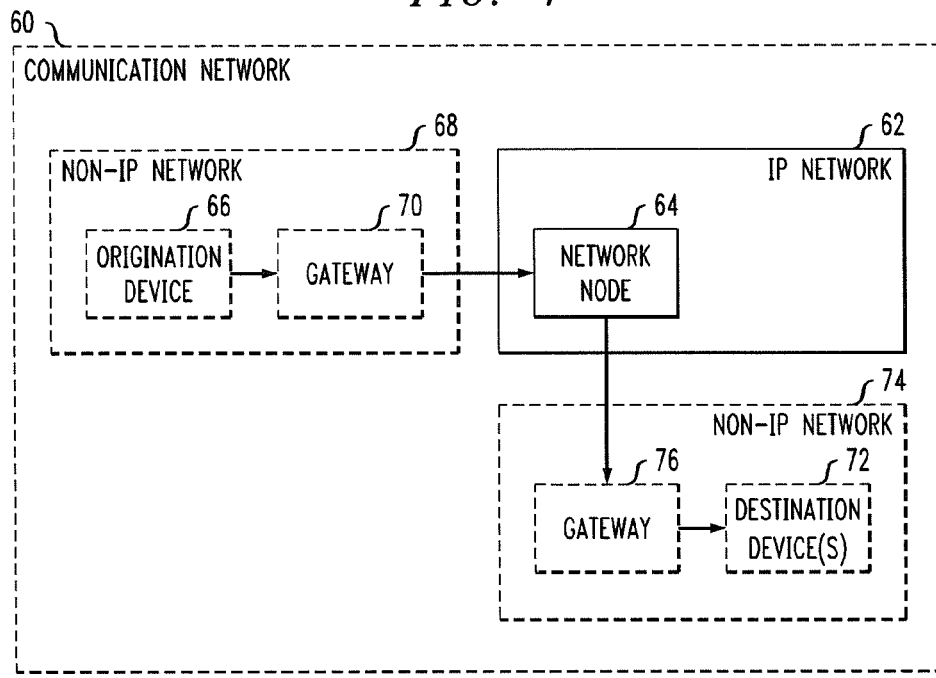
FIG. 4 is a block diagram of still another exemplary embodiment of a communication system with a network node in an IP network for screening a request to establish a SIP session.

Still another exemplary embodiment of a communication system 60 with an IP network 62 that includes a network node 64 for screening a request to establish a SIP session is shown in FIG. 4. In this embodiment, the SIP request is originated by an origination device 66 within a first non-IP network 68. The first non-IP network 68 may include a PSTN, a wireless telephone network, a cellular telephone network, a satellite telephone network, or any suitable type of non-IP communication network in any combination. The first non-IP network 68 also includes a gateway 70 to interface between the origination device 66 and the IP network 62. The SIP request identifies one or more destination devices 72 within a second non-IP network 74 as destinations for the SIP session. The second non-IP network 74 may include a PSTN, a wireless telephone network, a cellular telephone network, a satellite telephone network, or any suitable type of non-IP communication network in any combination. The second non-IP network 74 also includes a gateway 76 to interface between the destination device(s) 72 and the IP network 62.

Figure 5:
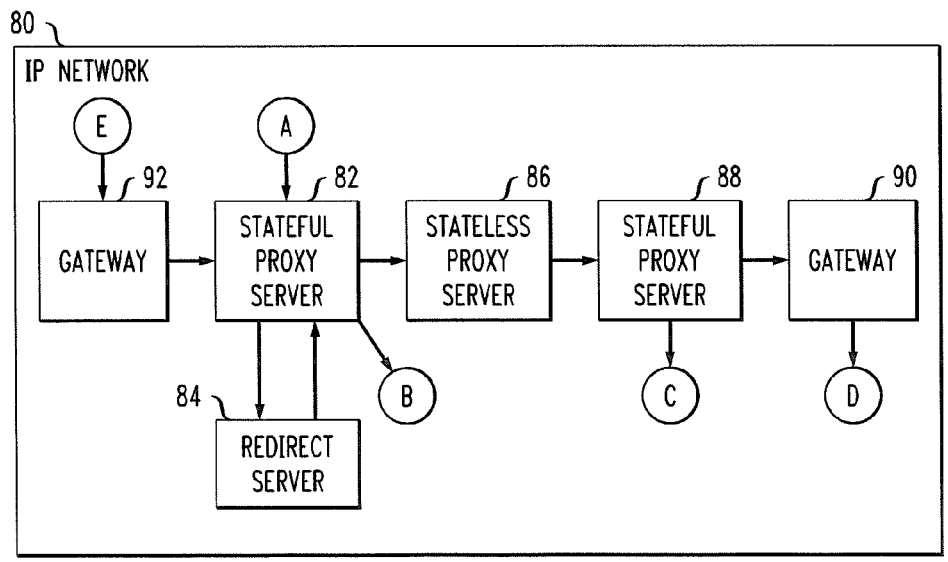
FIG. 5 is a block diagram of an exemplary embodiment of an IP network with various types of network nodes.

With reference to FIG. 5, an exemplary embodiment of an IP network 80 with various types of network nodes includes a first stateful proxy server 82, a redirect server 84, a stateless proxy server 86, a second stateful proxy server 88, a first gateway 90, and a second gateway 92. Any one or more of these various types of network nodes may implement various embodiments of the process for screening a request to establish a SIP session described herein.

In one scenario for a SIP session, the first stateful proxy server 82 receives a SIP request A from an origination device. In this scenario, the first stateful proxy server 82 passes SIP request B to a destination device identified in SIP request A. Notably, both the origination and destination devices are both within the IP network for this scenario and both are served by the first stateful proxy server 82. In this scenario, the process for screening a request to establish a SIP session is implemented by the first stateful proxy server 82.

In another scenario, the first stateful proxy server 82 receives a SIP request A from an origination device. In this scenario, the first stateful proxy server 82 passes SIP request C to a destination device for SIP request A. Notably, both the origination and destination devices are both within the IP network for this scenario. However, the destination device is served by the second stateful proxy server 88 and the origination device is served by the first stateful proxy server 82. Under these circumstances, the first stateful proxy server 82 may pass SIP request A to the redirect server 84 to obtain uniform resource identification information for the destination device. In this scenario, the process for screening a request to establish a SIP session may be implemented by the first stateful proxy server 82, redirect server 84, stateless proxy server 86, second stateful proxy server 88, or any combination thereof.

In yet another scenario, the first stateful proxy server 82 receives a SIP request A from an origination device. In this scenario, the first stateful proxy server 82 passes SIP request D to a destination device for SIP request A. Notably, the destination device is within a non-IP network for this scenario and the origination device is within the IP network. The destination device is accessible via the first gateway 90 and the origination device is served by the first stateful proxy server 82. Under these circumstances, the first stateful proxy server 82 may pass SIP request A to the redirect server 84 to obtain uniform resource identification information for the destination device. In this scenario, the process for screening a request to establish a SIP session may be implemented by the first stateful proxy server 82, redirect server 84, stateless proxy server 86, second stateful proxy server 88, first gateway 90, or any combination thereof.

In still another scenario, the first gateway 92 receives a SIP request E from an origination device. In this scenario, the first stateful proxy server 82 passes SIP request B to a destination device for SIP request E. Notably, the origination device is within a non-IP network for this scenario and the destination device is within the IP network. The origination device is accessible via the second gateway 92 and the destination device is served by the first stateful proxy server 82. In this scenario, the process for screening a request to establish a SIP session may be implemented by the first gateway 92, first stateful proxy server 82, or any combination thereof.

In still yet another scenario, the first gateway 92 receives a SIP request E from an origination device. In this scenario, the second stateful proxy server 88 passes SIP request C to a destination device for SIP request E. Notably, the origination device is within a non-IP network for this scenario and the destination device is within the IP network. The origination device is accessible via the second gateway 92 and the destination device is served by the second stateful proxy server 88. Under these circumstances, the first stateful proxy server 82 may pass SIP request E to the redirect server 84 to obtain uniform resource identification information for the destination device. In this scenario, the process for screening a request to establish a SIP session may be implemented by the first gateway 92, first stateful proxy server 82, redirect server 84, stateless proxy server 86, second stateful proxy server 88, or any combination thereof.

In another scenario, the first gateway 92 receives a SIP request E from an origination device. In this scenario, the second gateway 90 passes SIP request D to a destination device for SIP request E. Notably, both the origination and destination devices are within non-IP networks for this scenario. The origination device is accessible via the second gateway 92 and the destination device is accessible via the first gateway 90. Under these circumstances, the first stateful proxy server 82 may pass SIP request E to the redirect server 84 to obtain uniform resource identification information for the destination device. In this scenario, the process for screening a request to establish a SIP session may be implemented by the first gateway 92, first stateful proxy server 82, redirect server 84, stateless proxy server 86, second stateful proxy server 88, first gateway 90, or any combination thereof.

Figure 6:
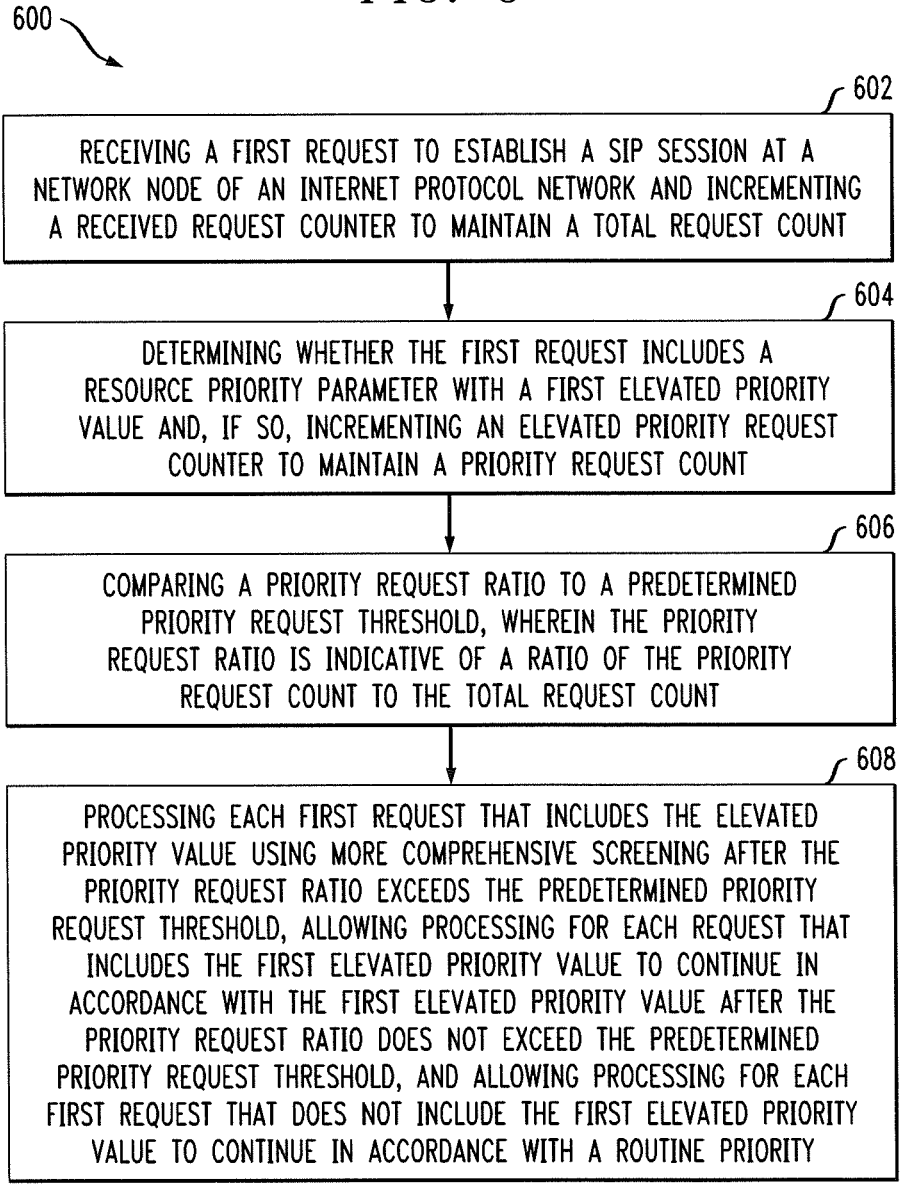
FIG. 6 is a flow chart of an exemplary embodiment of a process for screening a request to establish a SIP session.

With reference to FIG. 6, an exemplary embodiment of a process 600 for screening a request to establish a SIP session begins at 602 where a first request to establish a SIP session is received at a network node of an internet protocol network and a received request counter is incremented to maintain a total request count. Next, the process determines whether the first request includes a resource priority parameter with a first elevated priority value and, if so, increments an elevated priority request counter to maintain a priority request count (604). At 606, a priority request ratio is compared to a predetermined priority request threshold. The priority request ratio is indicative of a ratio of the priority request count to the total request count. Next, each first request that includes the elevated priority value is processed using more comprehensive screening after the priority request ratio exceeds the predetermined priority request threshold (608). However, processing for each first request that includes the first elevated priority value is allowed to continue in accordance with the first elevated priority value after the priority request ratio does not exceed the predetermined priority request threshold (608). Additionally, processing for each first request that does not include the first elevated priority value is allowed to continue in accordance with a routine priority (608). The received request and elevated priority request counters may be reset periodically at appropriate times to avoid overflow conditions and to reflect relatively current trends. Counter reset may be triggered by certain events, such as rising or falling threshold crossover; during light request traffic periods, particularly on days and times when request traffic is expected to be light; or daily, weekly, or another suitable calendar time period.

In a further embodiment, the process 600 also includes performing 602 through 608 in the same manner for each received request of a plurality of requests to establish SIP sessions received at the network node as for the first request. In a further embodiment, the more comprehensive screening in 608 includes i) determining an origination address for each received request that includes the first elevated priority value, ii) incrementing an address counter for each determined origination address to maintain a requestor count for each determined origination address, and iii) determining a requestor rate for each determined origination address indicative of a rate at which requests that include first elevated priority values are received from the corresponding origination address over time based at least in part on the corresponding requestor count. The address counters may be reset periodically at appropriate times to avoid overflow conditions and to reflect relatively current trends. Counter reset may be triggered by certain events, such as rising or falling threshold crossover; during light request traffic periods, particularly on days and times when request traffic is expected to be light; or daily, weekly, or another suitable calendar time period.

In the embodiment being described, the requestor rate for each determined origination address is compared to a predetermined rate threshold. In this embodiment, the resource priority parameter for each received request associated with each determined origination address that includes the first elevated priority value is changed after the requestor rate for the corresponding origination address exceeds the predetermined rate threshold such that subsequent processing is in accordance with the routine priority, except the resource priority parameter changing is bypassed for a predetermined portion of received requests associated with the corresponding origination address that include first elevated priority values after determining the requestor rate for the corresponding origination address exceeds the predetermined rate threshold and processing for the corresponding predetermined portion is allowed to continue in accordance with the first elevated priority value. Additionally, processing for each received request associated with each determined origination address that includes the first elevated priority value is allowed to continue in accordance with the first elevated priority value after the requestor rate for the corresponding origination address does not exceed the predetermined rate threshold.

In a further embodiment, the predetermined rate threshold is indicative of a potential denial of service attack at the network node associated with a given origination address. In another further embodiment, the predetermined rate threshold may be ten requests per minute, twenty requests per minute, within a range between ten and twenty requests per minute, or any suitable rate. In yet another further embodiment, the predetermined rate threshold is adjustable to facilitate tuning based at least in part on a capacity of the network node, a capacity of the internet protocol network, or a capacity of another node within the internet protocol network. In still another further embodiment, the predetermined portion is defined by 1/N, where N is an integer value that relates to N increments of the address counter for the corresponding origination address such that the bypassing of the resource priority parameter changing is performed once for each N increments of the corresponding address counter. In the embodiment being described, N may be 50, 200, an integer value within a range between 50 and 200, or any suitable integer value. In still yet another further embodiment, the predetermined portion is adjustable to facilitate tuning based at least in part on a capacity of the network node, a capacity of the internet protocol network, or a capacity of another node within the internet protocol network.

In yet another embodiment of the process 600, the first request is originated from an origination device that sets the resource priority parameter to the first elevated priority value based at least in part on user interaction. In the embodiment being described, the origination device may include a user agent client device, a landline telephone, a wireless telephone, a cellular telephone, a satellite telephone, a portable computer device, a computer work station, an IP telephone, a gateway from a non-internet protocol network to the internet protocol network, a switching node in a non-internet protocol network, or any suitable device capable of originating a request to establish a SIP session.

In still another embodiment of the process 600, the first request to establish a SIP session may include an INVITE request or any suitable SIP request identified in RFC 4412. In still yet another embodiment of the process 600, the network node may include a user agent server, a proxy server, a stateful proxy server, a stateless proxy server, a redirect server, a gateway, or any suitable IP network node. In another embodiment of the process 600, the internet protocol network is publicly accessible.

In yet another embodiment of the process 600, the first request includes a resource priority header field comprising at least one namespace parameter and the resource priority parameter for each namespace parameter. In the embodiment being described, multiple values are valid for the namespace parameter, including a Defense Switched Network (DSN) value, a Defense RED Switched Network (DRSN) value, a commercial (Q735) value, a GETS value, and a WPS value. In this embodiment, a priority value, an immediate value, a flash value, and a flash-override value are valid elevated priority values for the resource priority parameter associated with the DSN and DRSN namespace parameter values. In the embodiment being described, a flash-override-override value is another valid elevated priority value for the resource priority parameter associated with the DRSN namespace parameter value. In this embodiment, a level 4 lowest value, a level 3 lower value, a level 2 mid-range value, a level 1 higher value, and a level 0 highest value are valid elevated priority values for the resource priority parameter associated with the Q735, GETS, and WPS namespace parameter values. In the embodiment being described, a routine priority value is a valid value for the resource priority parameter associated with the DSN and DRSN namespace parameter values.

In still another embodiment of the process 600, a disaster recovery value, a public welfare and maintenance of national economic posture value, a public health, safety, and maintenance of law and order value, a national security posture and US population attack warning value, and a national security leadership value are valid elevated priority values for the resource priority parameter when the resource priority parameter is associated with a GETS. In still yet another embodiment of the process 600, a disaster recovery value, a public services/utilities, and public welfare value, a public health, safety, and law enforcement command value, a disaster response/military command control value, and an executive leadership and policy making value are valid elevated priority values for the resource priority parameter when the resource priority parameter is associated with a WPS.

In another embodiment of the process 600, the predetermined priority request threshold is indicative of a potential denial of service attack at the network node. In yet another embodiment of the process 600, the predetermined priority request threshold may be about one percent, about five percent, within a range between one and five percent, or any suitable percentage value. In still another embodiment of the process 600, the predetermined priority request threshold is adjustable to facilitate tuning based at least in part on a capacity of the network node, a capacity of the internet protocol network, or a capacity of another node within the internet protocol network.

In still yet another embodiment of the process 600, multiple elevated priority values are valid for the resource priority parameter and the first elevated priority value and predetermined priority request threshold relate to a select elevated priority value of the multiple elevated priority values. In a further embodiment, the process 600 also includes performing 604 through 608 in the same manner for each elevated priority value of the multiple elevated priority values as for the first elevated priority value. In a still further embodiment, the predetermined priority request threshold includes a specific priority request threshold for each elevated priority value of the multiple elevated priority values.

Figure 7:
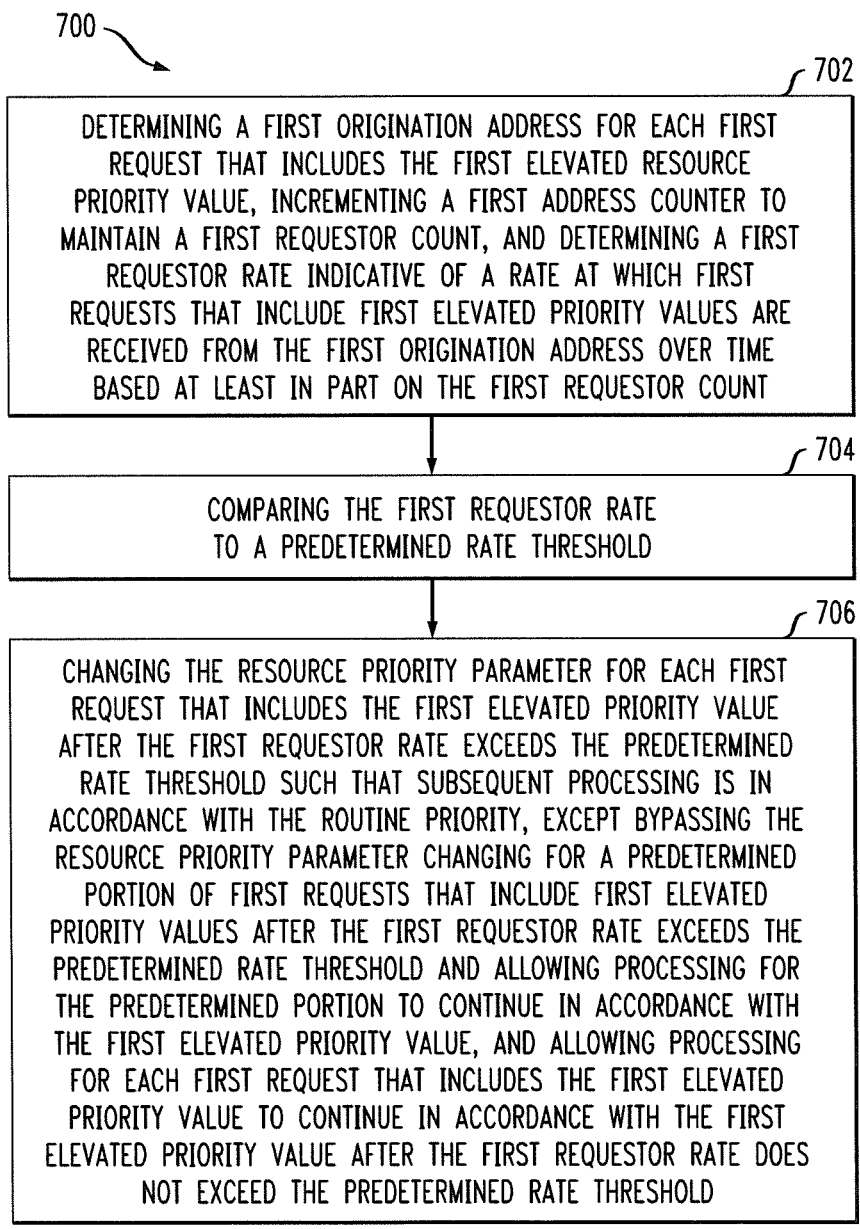
FIG. 7, in conjunction with FIG. 6, is a flow chart of another exemplary embodiment of a process for screening a request to establish a SIP session.

With reference to FIG. 6, in conjunction with FIG. 7, another exemplary embodiment of a process 700 includes 602 through 608 of FIG. 6 which expands upon the more comprehensive screening in 608. At 702, a first origination address for each first request that includes the first elevated resource priority value is determined, a first address counter is incremented to maintain a first requestor count, and a first requestor rate is determined. The first requestor rate is indicative of a rate at which first requests that include first elevated priority values are received from the first origination address over time based at least in part on the first requestor count. The first address counter may be reset periodically at appropriate times to avoid overflow conditions and to reflect relatively current trends. Counter reset may be triggered by certain events, such as rising or falling threshold crossover; during light request traffic periods, particularly on days and times when request traffic is expected to be light; or daily, weekly, or another suitable calendar time period.

Next, the first requestor rate is compared to a predetermined rate threshold (704). At 706, the resource priority parameter for each first request that includes the first elevated priority value is changed after the first requestor rate exceeds the predetermined rate threshold such that subsequent processing is in accordance with the routine priority, except the resource priority parameter changing is bypassed for a predetermined portion of first requests that include first elevated priority values after the first requestor rate exceeds the predetermined rate threshold and processing for the predetermined portion is allowed to continue in accordance with the first elevated priority value. Additionally, processing for each first request that includes the first elevated priority value is allowed to continue in accordance with the first elevated priority value after the first requestor rate does not exceed the predetermined rate threshold.

In another embodiment of the process 700, the predetermined rate threshold is indicative of a potential denial of service attack at the network node from at least the first origination address. In yet another embodiment of the process 700, the predetermined rate threshold may be ten requests per minute, twenty requests per minute, within a range between ten and twenty requests per minute, or any suitable rate. In still another embodiment of the process 700, the predetermined rate threshold is adjustable to facilitate tuning based at least in part on a capacity of the network node, a capacity of the internet protocol network, or a capacity of another node within the internet protocol network.

In still yet another embodiment of the process 700, the predetermined portion in 706 is defined by 1/N, where N is an integer value that relates to N increments of the first address counter such that the bypassing in 706 is performed once for each N increments of the first address counter. In the embodiment being described, N may be 50, 200, an integer value within a range between 50 and 200, or any suitable integer value. In another embodiment of the process 700, the predetermined portion in 706 is adjustable to facilitate tuning based at least in part on a capacity of the network node, a capacity of the internet protocol network, or a capacity of another node within the internet protocol network.

In yet another embodiment of the process 700, multiple elevated priority values are valid for the resource priority parameter and the first elevated priority value, predetermined priority request threshold, first address counter, first requestor rate, and predetermined rate threshold relate to a select elevated priority value of the multiple elevated priority values. In a further embodiment, the process 700 also includes performing 604 through 706 in the same manner for each elevated priority value of the multiple elevated priority values as for the first elevated priority value. In the embodiment being described, the predetermined priority request threshold includes a specific priority request threshold for each elevated priority value of the multiple elevated priority values, the first address counter includes a specific first address counter for each elevated priority value of the multiple elevated priority values, the first requestor rate includes a specific first requestor rate for each elevated priority value of the multiple elevated priority values, the predetermined rate threshold includes a specific predetermined rate threshold for each elevated priority value of the multiple elevated priority values, and 706 is performed in conjunction with each specific first requestor rate and corresponding specific predetermined rate threshold.

Figure 8:
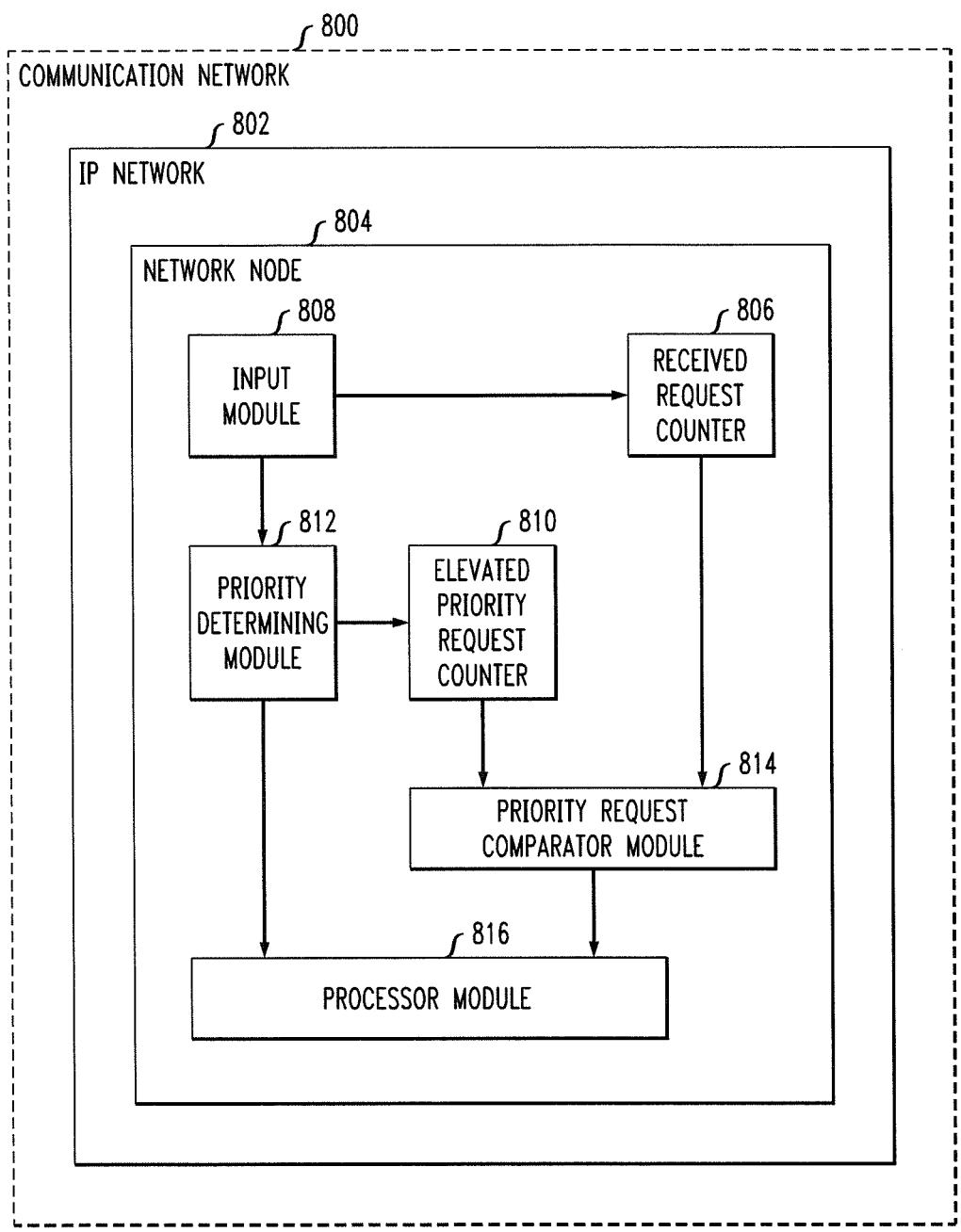
FIG. 8 is a block diagram of an exemplary embodiment of a network node in an IP network for screening a request to establish a SIP session.

With reference to FIG. 8, a communication network 800 includes an IP network 802 with an exemplary embodiment of a network node 804 for screening a request to establish a SIP session. The network node 804 includes a received request counter 806, an input module 808, an elevated priority request counter 810, a priority determining module 812, a priority request comparator module 814, and a processor module 816. The input module 808 for receiving a first request to establish a SIP session and in operative communication with the received request counter 806 for incrementing the received request counter to maintain a total request count. The priority determining module 812 in operative communication with the input module 808 for determining whether the first request includes a resource priority parameter with a first elevated priority value and, if so, in operative communication with the elevated priority request counter 810 for incrementing the elevated priority request counter to maintain a priority request count. The received request and elevated priority request counters may be reset periodically at appropriate times to avoid overflow conditions and to reflect relatively current trends. Counter reset may be triggered by certain events, such as rising or falling threshold crossover; during light request traffic periods, particularly on days and times when request traffic is expected to be light; or daily, weekly, or another suitable calendar time period.

The priority request comparator module 814 in operative communication with the received request counter 806 and elevated priority request counter 810 for comparing a priority request ratio to a predetermined priority request threshold. The priority request ratio being indicative of a ratio of the priority request count to the total request count. The processor module 816 in operative communication with the priority determining module 812 and priority request comparator module 814 for i) processing each first request that includes the first elevated priority value using more comprehensive screening after the priority request ratio exceeds the predetermined priority request threshold, ii) allowing processing for each first request that includes the first elevated priority value to continue in accordance with the first elevated priority value after the priority request ratio does not exceed the predetermined priority request threshold, and iii) allowing processing for each first request that does not include the first elevated priority value to continue in accordance with a routine priority.

In another embodiment of the network node 804, the received request counter 806, input module 808, elevated priority request counter 810, priority determining module 812, priority request comparator module 814, and processor module 816 operate for in the same manner for each received request of a plurality of requests to establish SIP sessions received by the input module 808 as for the first request. In the embodiment being described, the network node 804 also includes a plurality of address counters, an address/rate determining module, a priority rate comparator module, and a filtering module.

In the embodiment being described, the address/rate determining module being in operative communication with the priority determining module and priority request comparator module for determining an origination address for each received request that includes the first elevated priority value. In this embodiment, the address/rate determining module also is in operative communication with the plurality of address counters for incrementing an address counter for each determined origination address to maintain a requestor count for each determined origination address and determining a requestor rate for each determined origination address indicative of a rate at which requests that include first elevated priority values are received by the input module from the corresponding origination address over time based at least in part on the corresponding requestor count. The address counters may be reset periodically at appropriate times to avoid overflow conditions and to reflect relatively current trends. Counter reset may be triggered by certain events, such as rising or falling threshold crossover; during light request traffic periods, particularly on days and times when request traffic is expected to be light; or daily, weekly, or another suitable calendar time period.

In the embodiment being described, the priority rate comparator module being in operative communication with the address/rate determining module for comparing the requestor rate for each determined origination address to a predetermined rate threshold. In this embodiment, the filtering module being operative communication with the address/rate determining module and priority rate comparator module for changing the resource priority parameter for each received request associated with each determined origination address that includes the first elevated priority value after the requestor rate for the corresponding origination address exceeds the predetermined rate threshold such that subsequent processing is in accordance with the routine priority, except bypassing the resource priority parameter changing for a predetermined portion of received requests associated with the corresponding origination address that include first elevated priority values after the requestor rate for the corresponding origination address exceeds the predetermined rate threshold and allowing processing for the predetermined portion to continue in accordance with the first elevated priority value. In the embodiment being described, the filtering module also allowing processing for each received request associated with each determined origination address that includes the first elevated priority value to continue in accordance with the first elevated priority value after the requestor rate for the corresponding origination address does not exceed the predetermined rate threshold.

In the embodiment being described, the predetermined rate threshold is indicative of a potential denial of service attack at the network node 804 associated with a given origination address. In this embodiment, the predetermined rate threshold may be ten requests per minute, twenty requests per minute, within a range between ten and twenty requests per minute, or any suitable rate. In the embodiment being described, the predetermined rate threshold is adjustable to facilitate tuning based at least in part on a capacity of the network node 804, a capacity of the internet protocol network 802, or a capacity of another node within the internet protocol network 802. In this embodiment, the predetermined portion is defined by 1/N, where N is an integer value that relates to N increments of the address counter for the corresponding origination address such that the bypassing of the resource priority parameter changing is performed once for each N increments of the corresponding address counter. In the embodiment being described, N may be 50, 200, an integer value within a range between 50 and 200, or any suitable integer value. In this embodiment, the predetermined portion is adjustable to facilitate tuning based at least in part on a capacity of the network node 804, a capacity of the internet protocol network 802, or a capacity of another node within the internet protocol network 802.

In yet another embodiment of the network node 804, the first request is originated from an origination device that sets the resource priority parameter to the elevated priority value based at least in part on user interaction. In this embodiment, the origination device may include a user agent client device, a landline telephone, a wireless telephone, a cellular telephone, a satellite telephone, a portable computer device, a computer work station, an IP telephone, a gateway from a non-internet protocol network to the internet protocol network, a switching node in a non-internet protocol network, or any suitable origination device.

In still another embodiment of the network node 804, the first request to establish a SIP session may include an INVITE request or any suitable SIP request identified in RFC 4412. In still yet another embodiment, the network node 804 may include a user agent server, a proxy server, a stateful proxy server, a stateless proxy server, a redirect server, a gateway, or any suitable network node. In another embodiment of the network node 804, the internet protocol network 802 is publicly accessible.

In yet another embodiment of the network node 804, the first request includes a resource priority header field comprising at least one namespace parameter and the resource priority parameter for each namespace parameter. In a further embodiment, multiple values are valid for the namespace parameter, including a DSN value, a DRSN value, a commercial (Q735) value, a GETS value, and a WPS value. In this embodiment, a priority value, an immediate value, a flash value, and a flash-override value are valid elevated priority values for the resource priority parameter associated with the DSN and DRSN namespace parameter values. In the embodiment being described, a flash-override-override value is a valid elevated priority value for the resource priority parameter associated with the DRSN namespace parameter value. In this embodiment, a level 4 lowest value, a level 3 lower value, a level 2 mid-range value, a level 1 higher value, and a level 0 highest value are valid elevated priority values for the resource priority parameter associated with the Q735, GETS, and WPS namespace parameter values. In the embodiment being described, a routine priority value is a valid value for the resource priority parameter associated with the DSN and DRSN namespace parameter values.

In still another embodiment of the network node 804, a disaster recovery value, a public welfare and maintenance of national economic posture value, a public health, safety, and maintenance of law and order value, a national security posture and US population attack warning value, and a national security leadership value are valid elevated priority values for the resource priority parameter when the resource priority parameter is associated with a GETS. In still yet another embodiment of the network node 804, a disaster recovery value, a public services/utilities, and public welfare value, a public health, safety, and law enforcement command value, a disaster response/military command control value, and an executive leadership and policy making value are valid elevated priority values for the resource priority parameter when the resource priority parameter is associated with a WPS.

In another embodiment of the network node 804, the predetermined priority request threshold is indicative of a potential denial of service attack at the network node 804. In yet another embodiment of the network node 804, the predetermined priority request threshold may be about one percent, about five percent, within a range between one and five percent, or any suitable percentage. In still another embodiment of the network node 804, the predetermined priority request threshold is adjustable to facilitate tuning based at least in part on a capacity of the network node 804, a capacity of the internet protocol network 802, or a capacity of another node within the internet protocol network 802.

In still yet another embodiment of the network node 804, multiple elevated priority values are available for the resource priority parameter and the first elevated priority value and predetermined priority request threshold relate to a select elevated priority value of the multiple elevated priority values. In this embodiment, the received request counter 806, input module 808, elevated priority request counter 810, priority determining module 812, priority request comparator module 814, and processor module 816 operate in the same manner for each elevated priority value of the multiple elevated priority values as for the first elevated priority value. In the embodiment being described, the predetermined priority request threshold includes a specific priority request threshold for each elevated priority value of the multiple elevated priority values.

Figure 9:
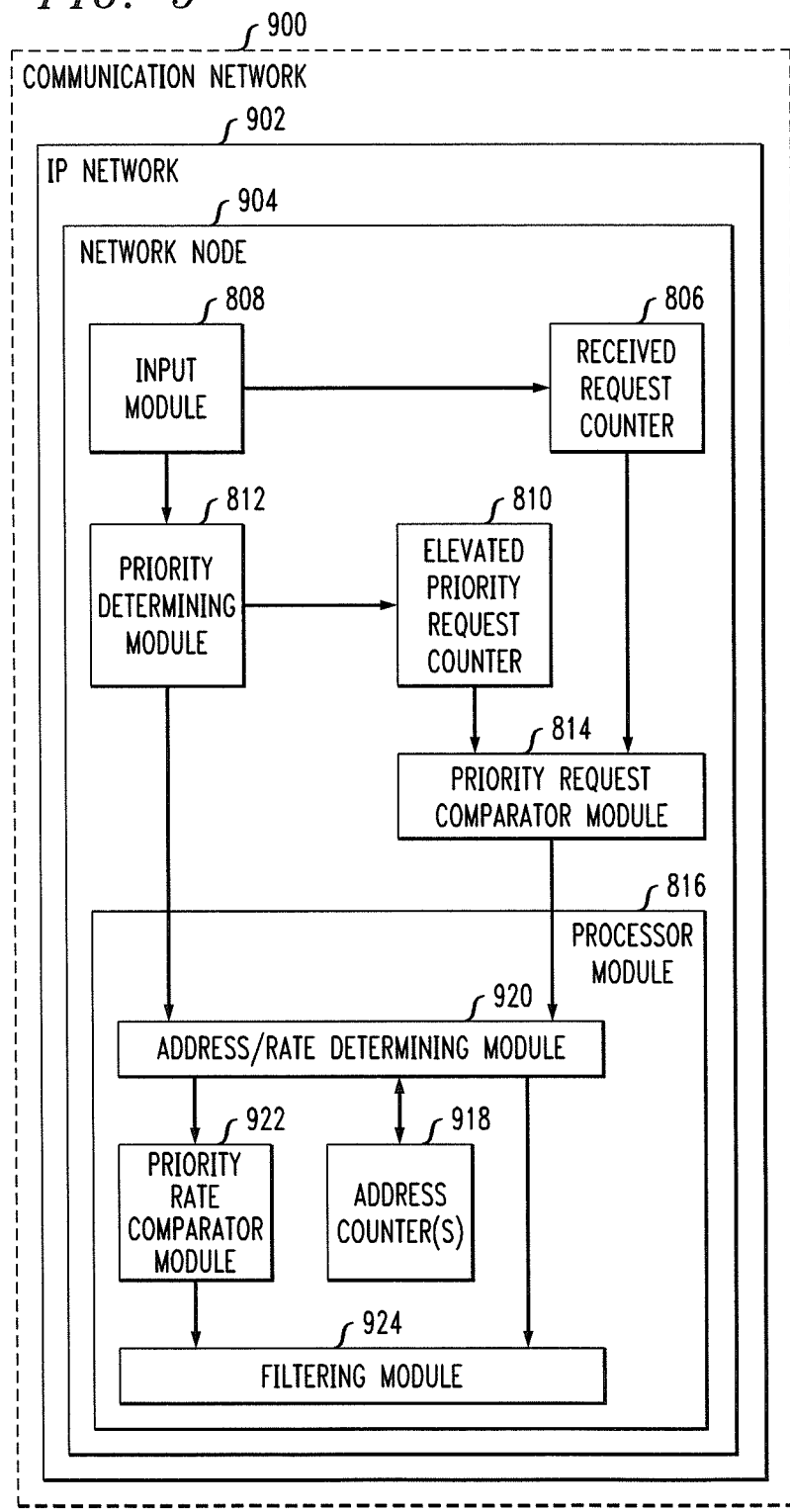
FIG. 9 is a block diagram of another exemplary embodiment of a network node in an IP network for screening a request to establish a SIP session.

With reference to FIG. 9, a communication network 900 includes an IP network 902 with an exemplary embodiment of a network node 904 for screening a request to establish a SIP session. The network node 904 includes the received request counter 806, input module 808, elevated priority request counter 810, priority determining module 812, priority request comparator module 814, and processor module 816 of FIG. 8 as well as a first address counter 918, an address/rate determining module 920, a priority rate comparator module 922, and a filtering module 924. The address/rate determining module 920 being in operative communication with the priority determining module 812 and priority request comparator module 814 for determining a first origination address for each first request that includes the first elevated priority value. The address/rate determining module 920 also being in operative communication with the first address counter 918 for incrementing the first address counter 918 to maintain a first requestor count and determining a first requestor rate indicative of a rate at which first requests that include first elevated priority values are received by the input module from the first origination address over time based at least in part on the first requestor count. The address counters may be reset periodically at appropriate times to avoid overflow conditions and to reflect relatively current trends. Counter reset may be triggered by certain events, such as rising or falling threshold crossover; during light request traffic periods, particularly on days and times when request traffic is expected to be light; or daily, weekly, or another suitable calendar time period.

The priority rate comparator module 922 being in operative communication with the address/rate determining module 920 for comparing the first requestor rate to a predetermined rate threshold. The filtering module 924 being in operative communication with the address/rate determining module 920 and priority rate comparator module 922 for changing the resource priority parameter for each first request that includes the first elevated priority value after the first requestor rate exceeds the predetermined rate threshold such that subsequent processing is in accordance with the routine priority, except bypassing the resource priority parameter changing for a predetermined portion of first requests that include first elevated priority values after the first requestor rate exceeds the predetermined rate threshold and allowing processing for the predetermined portion to continue in accordance with the first elevated priority value. The filtering module 924 also allowing processing for each first request that includes the first elevated priority value to continue in accordance with the first elevated priority value after the first requestor rate does not exceed the predetermined rate threshold.

In another embodiment of the network node 904, the predetermined rate threshold is indicative of a potential denial of service attack from at least the first origination address. In yet another embodiment of the network node 904, the predetermined rate threshold may be ten requests per minute, twenty requests per minute, within a range between ten and twenty requests per minute, or any suitable rate. In still another embodiment of the network node 904, the predetermined rate threshold is adjustable to facilitate tuning based at least in part on a capacity of the network node 904, a capacity of the internet protocol network 902, or a capacity of another node within the internet protocol network 902. In still yet another embodiment of the network node 904, the predetermined portion is defined by 1/N, where N is an integer value that relates to N increments of the first address counter such that the bypassing by the filtering module is performed once for each N increments of the first address counter. In this embodiment, N may be 50, 200, an integer value within a range between 50 and 200, or any suitable integer value. In another embodiment of the network node 904, the predetermined portion is adjustable to facilitate tuning by the filtering module 924 based at least in part on a capacity of the network node 904, a capacity of the internet protocol network 902, or a capacity of another node within the internet protocol network 902.

In another embodiment of the network node 904, multiple elevated priority values are valid for the resource priority parameter and the first elevated priority value, predetermined priority request threshold, first address counter, first requestor rate, and predetermined rate threshold relate to a select elevated priority value of the multiple elevated priority values. In this embodiment, the received request counter 806, input module 808, elevated priority request counter 810, priority determining module 812, priority request comparator module 814, processor module 816, first address counter 918, address/rate determining module 920, priority rate comparator module 922, and filtering module 924 operate in the same manner for each elevated priority value of the multiple elevated priority values as for the first elevated priority value. In the embodiment being described, the predetermined priority request threshold includes a specific priority request threshold for each elevated priority value of the multiple elevated priority values, the first address counter 918 includes a specific first address counter for each elevated priority value of the multiple elevated priority values, the first requestor rate includes a specific first requestor rate for each elevated priority value of the multiple elevated priority values, the predetermined rate threshold includes a specific predetermined rate threshold for each elevated priority value of the multiple elevated priority values, and the filtering module 924 operates on the resource priority parameter in conjunction with each specific first requestor rate and corresponding specific predetermined rate threshold.

Figure 10:
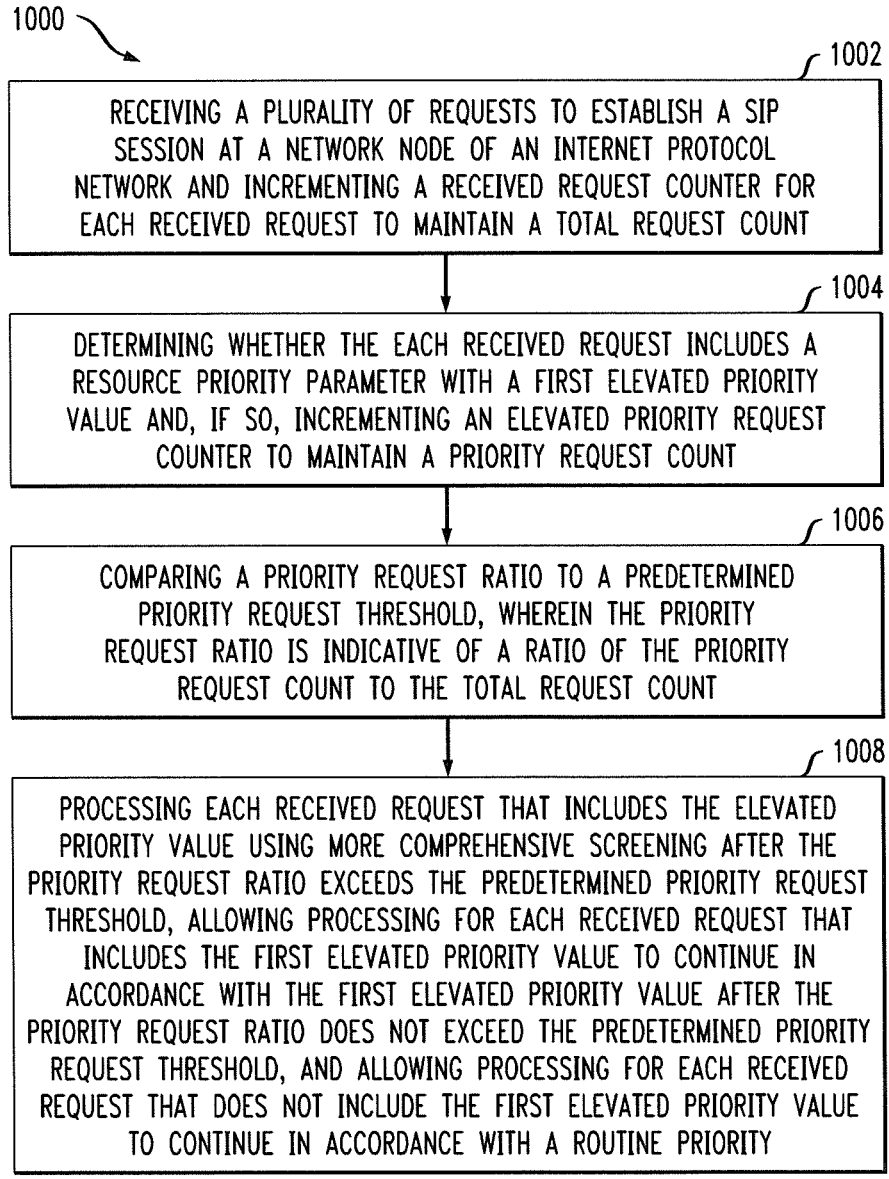
FIG. 10 is a flow chart of yet another exemplary embodiment of a process for screening a request to establish a SIP session.

With reference to FIG. 10, yet another exemplary embodiment of a process 1000 for screening a request to establish a SIP session begins at 1002 where a plurality of requests to establish a SIP session are received at a network node of an internet protocol network and a received request counter is incremented for each received request to maintain a total request count. Next, the process determines whether the each received request includes a resource priority parameter with a first elevated priority value and, if so, increments an elevated priority request counter to maintain a priority request count (1004). The received request and elevated priority request counters may be reset periodically at appropriate times to avoid overflow conditions and to reflect relatively current trends. Counter reset may be triggered by certain events, such as rising or falling threshold crossover; during light request traffic periods, particularly on days and times when request traffic is expected to be light; or daily, weekly, or another suitable calendar time period.

At 1006, a priority request ratio is compared to a predetermined priority request threshold. The priority request ratio is indicative of a ratio of the priority request count to the total request count. Next, each received request that includes the elevated priority value is processed using more comprehensive screening after the priority request ratio exceeds the predetermined priority request threshold (1008). Processing for each received request that includes the first elevated priority value is allowed to continue in accordance with the first elevated priority value after the priority request ratio does not exceed the predetermined priority request threshold (1008). Additionally, processing for each received request that does not include the first elevated priority value is allowed to continue in accordance with a routine priority (1008).

With reference to FIG. 11, in conjunction with FIG. 10, another exemplary embodiment of a process 1100 includes 1002 through 1008 of FIG. 10 and expands upon the more comprehensive screening in 1008. At 1008, an origination address for each received request that includes the first elevated priority value is determined, an address counter for each determined origination address is incremented to maintain a requestor count for each determined origination address, and a requestor rate for each determined origination address is determined. The requestor rates are indicative of a rate at which requests that include first elevated priority values are received from the corresponding origination address over time based at least in part on the corresponding requestor count. The address counters may be reset periodically at appropriate times to avoid overflow conditions and to reflect relatively current trends. Counter reset may be triggered by certain events, such as rising or falling threshold crossover; during light request traffic periods, particularly on days and times when request traffic is expected to be light; or daily, weekly, or another suitable calendar time period.

Next, the requestor rate for each determined origination address is compared to a predetermined rate threshold (1104). At 1106, the resource priority parameter for each received request associated with each determined origination address that includes the first elevated priority value is changed after the requestor rate for the corresponding origination address exceeds the predetermined rate threshold such that subsequent processing is in accordance with the routine priority, except the resource priority parameter changing is bypassed for a predetermined portion of received requests associated with the corresponding origination address that include first elevated priority values after determining the requestor rate for the corresponding origination address exceeds the predetermined rate threshold and processing for the corresponding predetermined portion is allowed to continue in accordance with the first elevated priority value. Additionally, processing for each received request associated with each determined origination address that includes the first elevated priority value is allowed to continue in accordance with the first elevated priority value after the requestor rate for the corresponding origination address does not exceed the predetermined rate threshold (1106).

In another embodiment of the process 1100, multiple elevated priority values are valid for the resource priority parameter. In this embodiment, the process 1100 also includes further comprising performing 1004 through 1106 in the same manner for each elevated priority value of the multiple elevated priority values as for the first elevated priority value. In the embodiment being described, the predetermined priority request threshold includes a specific priority request threshold for each elevated priority value of the multiple elevated priority values, each address counter for each determined origination address includes a specific address counter for each elevated priority value of the multiple elevated priority values, each requestor rate for each determined origination address includes a specific first requestor rate for each elevated priority value of the multiple elevated priority values, the predetermined rate threshold includes a specific predetermined rate threshold for each elevated priority value of the multiple elevated priority values, and 1106 is performed in conjunction with each specific requestor rate and corresponding specific predetermined rate threshold for each determined origination address.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method for screening a request to establish a SIP session, comprising:
    receiving a first request to establish a SIP session at a network node of an internet protocol network and incrementing a received request counter to maintain a total request count;
    determining whether the first request includes a resource priority parameter with a first elevated priority value and, if so, incrementing an elevated priority request counter to maintain a priority request count;
    comparing a priority request ratio to a predetermined priority request threshold, wherein the priority request ratio is indicative of a ratio of the priority request count to the total request count; and
    processing each first request that includes the elevated priority value using more comprehensive screening on condition that the priority request ratio exceeds the predetermined priority request threshold, allowing processing for each first request that includes the first elevated priority value to continue in accordance with the first elevated priority value on condition that the priority request ratio does not exceed the predetermined priority request threshold, and allowing processing for each first request that does not include the first elevated priority value to continue in accordance with a routine priority.

2. The method set forth in claim 1, the more comprehensive screening comprising:
    determining a first origination address for each first request that includes the first elevated resource priority value, incrementing a first address counter to maintain a first requestor count, and determining a first requestor rate indicative of a rate at which first requests that include first elevated priority values are received from the first origination address over time based at least in part on the first requestor count;
    comparing the first requestor rate to a predetermined rate threshold; and
    changing the resource priority parameter for each first request that includes the first elevated priority value on condition that the first requestor rate exceeds the predetermined rate threshold such that subsequent processing is in accordance with the routine priority, except bypassing the resource priority parameter changing for a predetermined portion of first requests that include first elevated priority values on condition that the first requestor rate exceeds the predetermined rate threshold, allowing processing for the predetermined portion to continue in accordance with the first elevated priority value, and allowing processing for each first request that includes the first elevated priority value to continue in accordance with the first elevated priority value on condition that the first requestor rate does not exceed the predetermined rate threshold.

3. The method set forth in claim 2 wherein multiple elevated priority values are valid for the resource priority parameter and the first elevated priority value, predetermined priority request threshold, first address counter, first requestor rate, and predetermined rate threshold relate to a select elevated priority value of the multiple elevated priority values.

4. The method set forth in claim 3, further comprising:
    performing the determining, comparing, and processing associated with each first request and the determining, comparing, and changing of the resource priority parameter for each first request in the same manner for each elevated priority value of the multiple elevated priority values as for the first elevated priority value;
    wherein the predetermined priority request threshold includes a specific priority request threshold for each elevated priority value of the multiple elevated priority values, the first address counter includes a specific first address counter for each elevated priority value of the multiple elevated priority values, the first requestor rate includes a specific first requestor rate for each elevated priority value of the multiple elevated priority values, the predetermined rate threshold includes a specific predetermined rate threshold for each elevated priority value of the multiple elevated priority values, and the changing of the resource priority parameter is performed in conjunction with each specific first requestor rate and corresponding specific predetermined rate threshold.

5. The method set forth in claim 1, further comprising:
    performing the receiving, determining, comparing, and processing associated with each first request in the same manner for each received request of a plurality of requests to establish SIP sessions received at the network node as for the first request.

6. The method set forth in claim 5, the more comprehensive screening comprising:
    determining an origination address for each received request that includes the first elevated priority value, incrementing an address counter for each determined origination address to maintain a requestor count for each determined origination address, and determining a requestor rate for each determined origination address indicative of a rate at which requests that include first elevated priority values are received from the corresponding origination address over time based at least in part on the corresponding requestor count;

comparing the requestor rate for each determined origination address to a predetermined rate threshold; and changing the resource priority parameter for each received request associated with each determined origination address that includes the first elevated priority value on condition that the requestor rate for the corresponding origination address exceeds the predetermined rate threshold such that subsequent processing is in accordance with the routine priority, except bypassing the resource priority parameter changing for a predetermined portion of received requests associated with the corresponding origination address that include first elevated priority values on condition that determining the requestor rate for the corresponding origination address exceeds the predetermined rate threshold, allowing processing for the corresponding predetermined portion to continue in accordance with the first elevated priority value, and allowing processing for each received request associated with each determined origination address that includes the first elevated priority value to continue in accordance with the first elevated priority value on condition that the requestor rate for the corresponding origination address does not exceed the predetermined rate threshold.

7. The method set forth in claim 1 wherein the first request to establish a SIP session includes an INVITE request.

8. The method set forth in claim 1 wherein the first request includes a resource priority header field comprising at least one namespace parameter and the resource priority parameter for each namespace parameter.

9. The method set forth in claim 1 wherein multiple elevated priority values are valid for the resource priority parameter and the first elevated priority value and predetermined priority request threshold relate to a select elevated priority value of the multiple elevated priority values.

10. The method set forth in claim 9, further comprising:
performing the determining, comparing, and processing associated with each first request in the same manner for each elevated priority value of the multiple elevated priority values as for the first elevated priority value;
wherein the predetermined priority request threshold includes a specific priority request threshold for each elevated priority value of the multiple elevated priority values.

11. An apparatus in an internet protocol network for screening a request to establish a SIP session, comprising:
a received request counter;
a receiver configured to receive a first request to establish a SIP session and configured to increment the received request counter to maintain a total request count;
an elevated priority request counter;
a priority determining module configured to increment the elevated priority request counter to maintain a priority request count on condition that the first request includes a resource priority parameter with a first elevated priority value;
a priority request comparator configured to compare a priority request ratio to a predetermined priority request threshold, wherein the priority request ratio is indicative of a ratio of the priority request count to the total request count; and
a processor configured to process each first request that includes the first elevated priority value using more comprehensive screening on condition that the priority request ratio exceeds the predetermined priority request threshold, configured to allow processing for each first request that includes the first elevated priority value to continue in accordance with the first elevated priority value on condition that the priority request ratio does not exceed the predetermined priority request threshold, and configured to allow processing for each first request that does not include the first elevated priority value to continue in accordance with a routine priority.

12. The apparatus set forth in claim 11, the processor module comprising:
a first address counter;
an address/rate determining module configured to determine a first origination address for each first request that includes the first elevated priority value, configured to increment the first address counter to maintain a first requestor count, and configured to determine a first requestor rate indicative of a rate at which first requests that include first elevated priority values are received by the receiver from the first origination address over time based at least in part on the first requestor count;
a priority rate comparator configured to compare the first requestor rate to a predetermined rate threshold; and
a filtering module configured to change the resource priority parameter for each first request that includes the first elevated priority value on condition that the first requestor rate exceeds the predetermined rate threshold such that subsequent processing is in accordance with the routine priority, except bypassing the resource priority parameter changing for a predetermined portion of first requests that include first elevated priority values on condition that the first requestor rate exceeds the predetermined rate threshold, configured to allow processing for the predetermined portion to continue in accordance with the first elevated priority value, and configured to allow processing for each first request that includes the first elevated priority value to continue in accordance with the first elevated priority value on condition that the first requestor rate does not exceed the predetermined rate threshold.

13. The apparatus set forth in claim 11 wherein the received request counter, receiver, elevated priority request counter, priority determining module, priority request comparator, and processor operate in the same manner for each received request of a plurality of requests to establish SIP sessions received by the receiver as for the first request.

14. The apparatus set forth in claim 13, the processor comprising:
a plurality of address counters;
an address/rate determining module configured to determine an origination address for each received request that includes the first elevated priority value, configured to increment an address counter for each determined origination address to maintain a requestor count for each determined origination address, and configured to determine a requestor rate for each determined origination address indicative of a rate at which requests that include first elevated priority values are received by the receiver from the corresponding origination address over time based at least in part on the corresponding requestor count;

a priority rate comparator configured to compare the requestor rate for each determined origination address to a predetermined rate threshold; and a filtering module configured to change the resource priority parameter for each received request associated with each determined origination address that includes the first elevated priority value on condition that the requestor rate for the corresponding origination address exceeds the predetermined rate threshold such that subsequent processing is in accordance with the routine priority, except bypassing the resource priority parameter changing for a predetermined portion of received requests associated with the corresponding origination address that include first elevated priority values on condition that the requestor rate for the corresponding origination address exceeds the predetermined rate threshold, configured to allow processing for the predetermined portion to continue in accordance with the first elevated priority value, and configured to allow processing for each received request associated with each determined origination address that includes the first elevated priority value to continue in accordance with the first elevated priority value on condition that the requestor rate for the corresponding origination address does not exceed the predetermined rate threshold.

15. The apparatus set forth in claim 11 wherein the first request is originated from an origination device that sets the resource priority parameter to the elevated priority value based at least in part on user interaction.

16. The apparatus set forth in claim 11 wherein the network node includes at least one of a user agent server, a proxy server, a stateful proxy server, a stateless proxy server, a redirect server, and a gateway.

17. The apparatus set forth in claim 11 wherein multiple elevated priority values are available for the resource priority parameter and the first elevated priority value and predetermined priority request threshold relate to a select elevated priority value of the multiple elevated priority values.

18. A method for screening a request to establish a SIP session, comprising:

receiving a plurality of requests to establish a SIP session at a network node of an internet protocol network and incrementing a received request counter for each received request to maintain a total request count;

determining whether the each received request includes a resource priority parameter with a first elevated priority value and, if so, incrementing an elevated priority request counter to maintain a priority request count;

comparing a priority request ratio to a predetermined priority request threshold, wherein the priority request ratio is indicative of a ratio of the priority request count to the total request count; and processing each received request that includes the elevated priority value using more comprehensive screening on condition that the priority request ratio exceeds the predetermined priority request threshold, allowing processing for each received request that includes the first elevated priority value to continue in accordance with the first elevated priority value on condition that the priority request ratio does not exceed the predetermined priority request threshold, and allowing processing for each received request that does not include the first elevated priority value to continue in accordance with a routine priority.

19. The method set forth in claim 18, the more comprehensive screening comprising:

determining an origination address for each received request that includes the first elevated priority value, incrementing an address counter for each determined origination address to maintain a requestor count for each determined origination address, and determining a requestor rate for each determined origination address indicative of a rate at which requests that include first elevated priority values are received from the corresponding origination address over time based at least in part on the corresponding requestor count;

comparing the requestor rate for each determined origination address to a predetermined rate threshold; and changing the resource priority parameter for each received request associated with each determined origination address that includes the first elevated priority value on condition that the requestor rate for the corresponding origination address exceeds the predetermined rate threshold such that subsequent processing is in accordance with the routine priority, except bypassing the resource priority parameter changing for a predetermined portion of received requests associated with the corresponding origination address that include first elevated priority values on condition that determining the requestor rate for the corresponding origination address exceeds the predetermined rate threshold, allowing processing for the corresponding predetermined portion to continue in accordance with the first elevated priority value, and allowing processing for each received request associated with each determined origination address that includes the first elevated priority value to continue in accordance with the first elevated priority value on condition that the requestor rate for the corresponding origination address does not exceed the predetermined rate threshold.

20. The method set forth in claim 19 wherein multiple elevated priority values are valid for the resource priority parameter, the method further comprising:

performing the determining, comparing, and processing associated with each received request and the determining, comparing, and changing of the resource priority parameter for each received request in the same manner for each elevated priority value of the multiple elevated priority values as for the first elevated priority value, wherein the predetermined priority request threshold includes a specific priority request threshold for each elevated priority value of the multiple elevated priority values, each address counter for each determined origination address includes a specific address counter for each elevated priority value of the multiple elevated priority values, each requestor rate for each determined origination address includes a specific first requestor rate for each elevated priority value of the multiple elevated priority values, the predetermined rate threshold includes a specific predetermined rate threshold for each elevated priority value of the multiple elevated priority values, and the changing of the resource priority parameter is performed in conjunction with each specific requestor rate and corresponding specific predetermined rate threshold for each determined origination address.

* * * * *